(12) United States Patent
Chuang et al.

(10) Patent No.: US 9,046,745 B2
(45) Date of Patent: Jun. 2, 2015

(54) ILLUMINATION SYSTEM, PROJECTION DEVICE AND ILLUMINATION METHOD

(71) Applicants: Keng-Han Chuang, Hsinchu (TW); Teng-Hung Hung, Hsinchu (TW)

(72) Inventors: Keng-Han Chuang, Hsinchu (TW); Teng-Hung Hung, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 177 days.

(21) Appl. No.: 13/776,735

(22) Filed: Feb. 26, 2013

(65) Prior Publication Data

US 2014/0055754 A1      Feb. 27, 2014

(30) Foreign Application Priority Data

Aug. 24, 2012   (CN) .......................... 2012 1 0305181

(51) Int. Cl.
  *G03B 21/14*     (2006.01)
  *G03B 21/00*     (2006.01)
  (Continued)

(52) U.S. Cl.
  CPC ............ *G03B 21/005* (2013.01); *G02F 1/0136* (2013.01); *H04N 9/3197* (2013.01); *H04N 5/7441* (2013.01); *G02B 27/28* (2013.01); *G03B 21/204* (2013.01); *G03B 21/2066* (2013.01); *G03B 21/2073* (2013.01); *G03B 33/08* (2013.01); *H04N 9/3114* (2013.01);
  (Continued)

(58) Field of Classification Search
  CPC ... H04N 5/7441; H04N 9/3197; G03B 21/204
  USPC .............. 353/20, 31, 33, 84, 85, 99;
         348/742–747, 750, 752, 758, 762, 767;
         349/1, 5–7, 9, 18, 69, 117, 121
  See application file for complete search history.

(56) References Cited

U.S. PATENT DOCUMENTS

| 6,710,921 B2 | 3/2004 | Hansen et al. |
| 7,445,340 B2 | 11/2008 | Conner et al. |

(Continued)

FOREIGN PATENT DOCUMENTS

| CN | 101923272 | 12/2010 |
| CN | 102033397 | 4/2011 |

(Continued)

OTHER PUBLICATIONS

"Office Action of China Counterpart Application," issued on Feb. 4, 2015, p. 1-12, in which the listed references were cited.

*Primary Examiner* — Sultan Chowdhury
(74) *Attorney, Agent, or Firm* — Jianq Chyun IP Office (57) ABSTRACT

An illumination system, a projection device, and an illumination method are provided. The illumination system includes a polarized light source, a polarization switching element, a beam splitting element, a wavelength conversion element, a reflective element, and a wave plate. The polarized light source emits a polarized light beam with a first color. The polarization switching element switches a polarized direction of the polarized light beam at different time points. The beam splitting element separates polarized light beams having different polarized directions. The wavelength conversion element converts the polarized light beam having a first polarized direction to a converted light beam. The reflective element reflects the polarized light beam having a second polarized direction to form a reflected light beam. The beam splitting element combines the converted light beam and the reflected light beam comes from the wave plate disposed between the beam splitting element and the reflective element.

20 Claims, 9 Drawing Sheets

(51) Int. Cl.
  *G02F 1/01* (2006.01)
  *H04N 9/31* (2006.01)
  *H04N 5/74* (2006.01)
  *G02B 27/28* (2006.01)
  *G03B 21/20* (2006.01)
  *G03B 33/08* (2006.01)

(52) U.S. Cl.
  CPC ........... *H04N9/3158* (2013.01); *H04N 9/3167* (2013.01); *G02B 27/283* (2013.01)

(56) References Cited

U.S. PATENT DOCUMENTS

| | | |
|---|---|---|
| 8,733,940 B2 | 5/2014 | Tanaka et al. |
| 8,820,940 B2 * | 9/2014 | Kita ................................ 353/84 |
| 2011/0187999 A1 * | 8/2011 | Hirata et al. .................... 353/20 |
| 2012/0038892 A1 * | 2/2012 | Kurtz et al. ..................... 353/31 |
| 2012/0140183 A1 | 6/2012 | Tanaka et al. |
| 2013/0321718 A1 * | 12/2013 | Huang .............................. 349/5 |

FOREIGN PATENT DOCUMENTS

| | | |
|---|---|---|
| CN | 102566231 | 7/2012 |
| JP | 4784262 | 10/2011 |
| TW | 380213 | 1/2000 |
| WO | 2011153801 | 12/2011 |

\* cited by examiner

ILLUMINATION SYSTEM, PROJECTION DEVICE AND ILLUMINATION METHOD

CROSS-REFERENCE TO RELATED APPLICATION

This application claims the priority benefit of China application serial no. 201210305181.X, filed on Aug. 24, 2012. The entirety of the above-mentioned patent application is hereby incorporated by reference herein and made a part of this specification.

BACKGROUND OF THE INVENTION

1. Field of the Invention

The invention relates to an illumination system, a projection device, and an illumination method.

2. Description of Related Art

In recent years, as the technology of solid-state light source elements becomes mature and the demand for miniaturization of projection devices rises, more and more solid-state light sources have been used as core elements of illumination systems in the projection devices. The solid-state light source has advantages, such as smaller size, longer lifetime, lower power consumption, and high reliability, and is therefore gradually replacing a conventional incandescent light source.

Light emitting diode (LED) and laser are commonly seen solid-state light sources. When designing the illumination system of the projection device, the space that the solid-state light source occupies in the device has to be taken into consideration no matter a light emitting diode light source or a laser light source is used.

Taiwan Patent No. 380213 has disclosed an illumination device that includes a light source, a wedge-shaped glass column matrix, a polarization converter, and a light valve. U.S. Pat. No. 7,445,340 has disclosed an illumination device which includes a light emitting diode light source, a back plate, a light collecting element, a light tube, a focusing optical element, a polarized light splitting element, a reflective filter film, a polarization converter, another focusing optical element, another light tube, a fluorescent material, a reflector, and another back plate. U.S. Pat. No. 6,710,921 has disclosed a polarizing device to generate a polarized light.

SUMMARY OF THE INVENTION

The invention provides an illumination system that has a simplified structure and is adapted for decreasing the size and the production cost thereof.

The invention provides a projection device that has a simplified structure and is adapted for decreasing the overall size and the production cost thereof.

The invention provides an illumination method for using a polarized light beam efficiently by means of a time-sharing method.

Other objects and advantages of the invention can be understood from the technical features broadly embodied and described as follows.

In order to achieve one or a part of or all of the above or any other objects, an embodiment of the invention provides an illumination system including a polarized light source, a polarization switching element, a beam splitting element, a wavelength conversion element, a reflective element, and a wave plate. The polarized light source emits a polarized light beam with a first color, and the polarization switching element and the beam splitting element are disposed on a transmission path of the polarized light beam. The polarization switching element switches a polarized direction of the polarized light beam to one of a first polarized direction and a second polarized direction at different time points. The beam splitting element splits the polarized light beam having the first polarized direction and the polarized light beam having the second polarized direction. The wavelength conversion element converts the polarized light beam having the first polarized direction from the beam splitting element to a converted light beam with a second color. The reflective element reflects the polarized light beam having the second polarized direction from the beam splitting element to form a reflected light beam. The wave plate is disposed on a transmission path of the polarized light beam having the second polarized direction and the reflected light beam, and the wave plate is between the beam splitting element and the reflective element. In addition, the beam splitting element combines the converted light beam and the reflected light beam from the wave plate.

An embodiment of the invention provides a projection device including the illumination system, a light valve, and a projection lens. The illumination system combines the converted light beam and the reflected light beam from the wave plate to form an illumination light beam, and the light valve converts the illumination light beam into an image light beam. The projection lens is disposed on a transmission path of the image light beam.

An embodiment of the invention provides an illumination method, which includes: providing a polarized light beam with a first color; switching a polarized direction of the polarized light beam to one of a first polarized direction and a second polarized direction at different time points; splitting the polarized light beam having the first polarized direction and the polarized light beam having the second polarized direction; converting the polarized light beam having the first polarized direction to a converted light beam with a second color; reflecting the polarized light beam having the second polarized direction to form a reflected light beam; and combining the converted light beam and the reflected light beam to form an illumination light beam.

Based on the above, in the illumination system and the projection device of the embodiments of the invention, the polarization switching element is used to switch the polarized direction of the polarized light beam to different polarized directions at different time points. The beam splitting element is used to split the polarized light beams having different polarized directions. Moreover, the reflective element is used to reflect the polarized light beam having the second polarized direction back to the beam splitting element for combining light. Therefore, the structures of the illumination system and the projection device are effectively reduced to decrease the sizes and the production costs thereof. The illumination method in the embodiment of the invention switches the polarized direction of the polarized light beam to one of the first polarized direction and the second polarized direction respectively at different time points; thus, the polarized light beam is used effectively by means of the time-sharing method.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
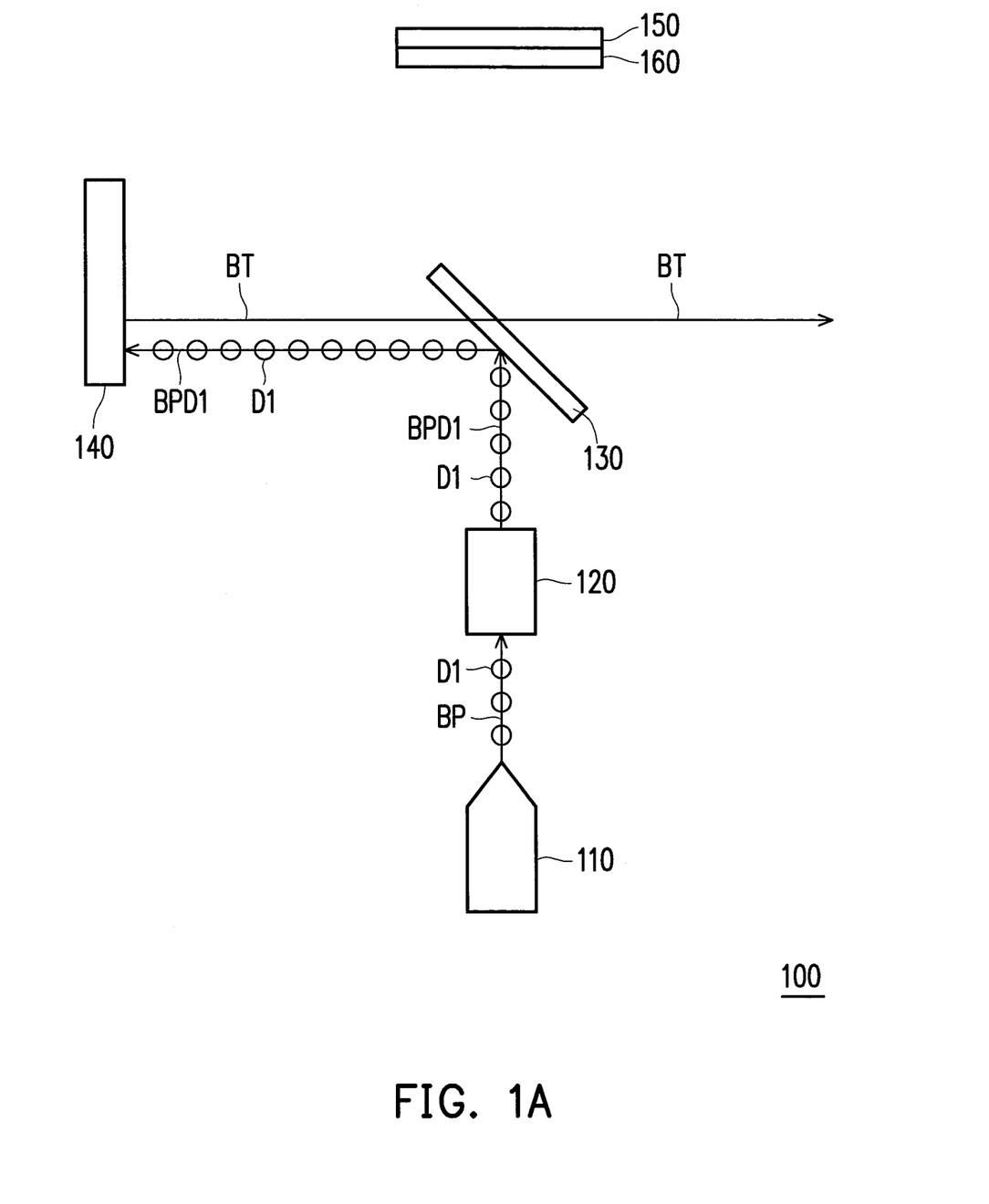
FIGS. 1A and 1B are schematic views of an illumination system according to an embodiment of the invention.
Figure 1B:
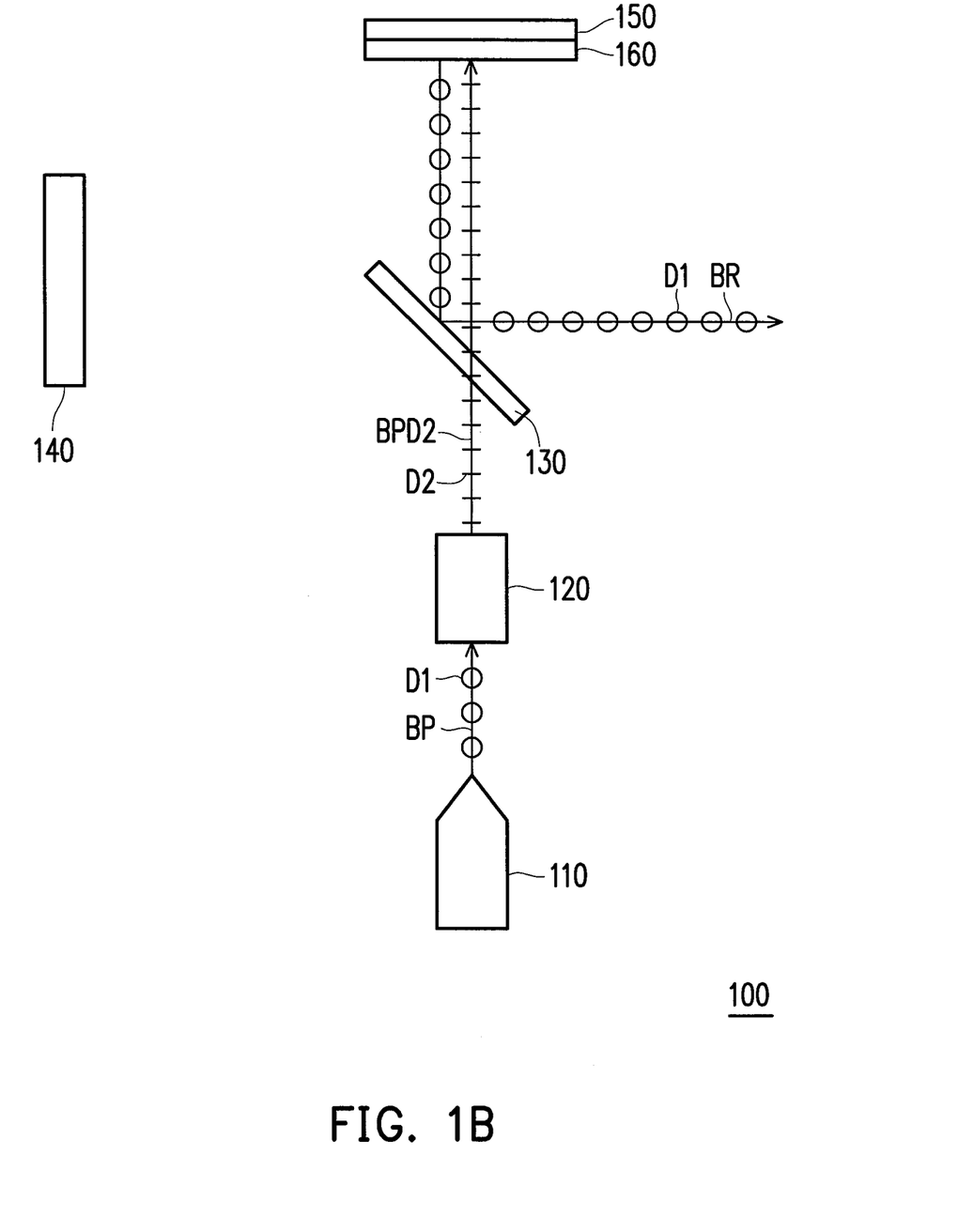

FIGS. 1A and 1B are schematic views of an illumination system 100 according to an embodiment of the invention. Referring to FIGS. 1A and 1B, the illumination system 100 includes a polarized light source 110, a polarization switching element 120, a beam splitting element 130, a wavelength conversion element 140, a reflective element 150, and a wave plate 160. The polarized light source 110 is disposed inside the illumination system 100 to emit a polarized light beam BP having a first color. The polarization switching element 120 is disposed on a transmission path of the polarized light beam BP and switches the polarized light beam BP to a first polarized direction D1 or a second polarized direction D2 at different time points. In this embodiment, the polarization switching element 120, for example, is a switchable wave plate. In this embodiment, the first polarized direction D1 and the second polarized direction D2 are, for example, an S polarized direction and a P polarized direction relative to the beam splitting element 130. More specifically, FIG. 1A illustrates a transmission path of a polarized light beam BPD1 having the first polarized direction D1, and FIG. 1B illustrates a transmission path of a polarized light beam BPD2 having the second polarized direction D2.

For example, the polarized light source 110 is a laser light source, and the polarized light beam BP (i.e. laser beam) emitted from the polarized light source 110 having the first polarized direction D1, and the polarization switching element 120, for example, is a liquid crystal cell. Liquid crystal molecules in the liquid crystal cell may be rotated by applying a voltage or remain in an original state by not applying the voltage, in order for the liquid crystal cell to generate an effect of a half wave plate or to remain in a transparent state without a phase delay effect. When the liquid crystal cell is in the transparent state that has no phase delay effect, the polarized direction of the polarized light beam BP remains the first polarized direction D1 after the polarized light beam BP passes through the liquid crystal cell. When the liquid crystal cell is in the state that has the effect of half wave plate, the polarized direction of the polarized light beam BP changes from the first polarized direction D1 to the second polarized direction D2 after the polarized light beam BP passes through the liquid crystal cell. However, in other embodiments, the polarized light beam BP emitted from the polarized light source 110 may have the second polarized direction D2, and the polarization switching element 120 is, for example, a switchable wave plate. During the state that the polarization switching element 120 having no phase delay effect, the polarized light beam BP is allowed to pass through and the polarized direction thereof remains the second polarized direction D2. During the state that the polarization switching element 120 having the effect of half wave plate, the polarized direction of the polarized light beam BP is converted from the second polarized direction D2 to the first polarized direction D1. In addition, the polarized direction of the polarized light beam BP emitted from the polarized light source 110 may be different from the first polarized direction D1 and the second polarized direction D2, and the switchable wave plate is adapted for switching to a different phase delay state, so as to switch the polarized direction of the polarized light beam BP to the first polarized direction D1 and the second polarized direction D2 respectively.

Referring to FIG. 1A, when the polarized light beam BP having the first polarized direction D1 emitted from the polarized light source 110 passes through the polarization switching element 120, the polarization switching element 120 is in the transparent state that has no phase delay effect, such that the polarized light beam BP is the polarized light beam BPD1 still having the first polarized direction D1. On the contrary, referring to FIG. 1B, if the polarization switching element 120 switches the polarized direction of the polarized light beam BP having the first polarized direction D1 emitted from the polarized light source 110 to the second polarized direction D2, the polarized light beam BP becomes the polarized light beam BPD2 having the second polarized direction D2 through the switch of the polarization switching element 120.

The beam splitting element 130 is disposed on the transmission paths of the polarized light beams BPD1 and BPD2 and is used to split the polarized light beam BPD1 having the first polarized direction D1 and the polarized light beam BPD2 having the second polarized direction D2. In this embodiment, the beam splitting element 130 is a polarized beam splitting plate or a polarized beam splitting prism for splitting polarized beams having different polarized directions. The beam splitting element 130 reflects the polarized light beam BPD1 having the first polarized direction D1 and allows the polarized light beam BPD2 having the second polarized direction D2 to pass through, in order to separate the polarized light beams having different polarized directions.

The wavelength conversion element 140 converts the polarized light beam BPD1 having the first polarized direction D1 from the beam splitting element 130 to a converted light beam BT with a second color. The reflective element 150 reflects the polarized light beam BPD2 having the second polarized direction D2 from the beam splitting element 130 to a reflected light beam BR. Specifically, the wavelength conversion element 140 is disposed on the transmission path of the polarized light beam BPD1, and the reflective element 150 is disposed on the transmission path of the polarized light beam BPD2. The wave plate 160 is disposed on the transmission path of the polarized light beam BPD2 having the second polarized direction D2 and reflected light beam BR and between the beam splitting element 130 and the reflective element 150. The converted light beam BT and the reflected light beam BR may be transmitted back to the beam splitting element 130 on a reverse direction along the transmission paths of the polarized light beams BPD1 and BPD2 respectively. The beam splitting element 130 combines the converted light beam BT and the reflected light beam BR from the wave plate 160.

Details of the transmission paths of the polarized light beams BPD1 and BPD2 and functions of the related elements are explained below. In FIGS. 1A and 1B, the beam splitting element 130 reflects the polarized light beam BPD1 having the first polarized direction D1 from the polarization switching element 120 to the wavelength conversion element 140 and allows the polarized light beam BPD2 having the second polarized direction D2 from the polarization switching element 120 to pass through and transmit to the wave plate 160.

Referring to FIG. 1A, when the polarized light beam BPD1 having the first polarized direction D1 is transmitted to the wavelength conversion element 140, the polarized light beam BPD1 is converted to the converted light beam BT, which is with the second color and has no particular polarized direction. For example, a surface of the wavelength conversion element 140 is applied with a fluorescent material. When the polarized light beam BPD1 is transmitted to the surface of the wavelength conversion element 140, the fluorescent material is excited by the polarized light beam BPD1 to generate the converted light beam BT with the second color, which does not have a particular polarized direction. The converted light beam BT is transmitted to the beam splitting element 130 in the reverse direction along the transmission path of the polarized light beam BPD1. In this embodiment, the beam splitting element 130, such as a blue polarization beam splitter, only has a polarized light splitting effect on the polarized light beams BPD1 and BPD2 with the first color (e.g. blue), but has no polarized light splitting effect on the converted light beam BT with the second color (e.g. red, green, or other color). Accordingly, when the converted light beam BT with the second color is transmitted back to the beam splitting element 130, the converted light beam BT passes through the beam splitting element 130, and a luminance thereof is not decreased due to the polarized light splitting effect.

Referring to FIG. 1B, when the polarized light beam BPD2 having the second polarized direction D2 is transmitted to the reflective element 150, the polarized light beam BPD2 passes through the wave plate 160 between the reflective element 150 and the beam splitting element 130. Then, the polarized light beam BPD2 is reflected by the reflective element 150 to form the reflected light beam BR, which passes through the wave plate 160 again. In this embodiment, the wave plate 160 may be a quarter wave plate. The reflected light beam BR that passes through the wave plate 160 and is transmitted back to the beam splitting element 130 on the reverse direction along the transmission path of the polarized light beam BPD2 and has the first polarized direction D1. Therefore, the reflected light beam BR, as shown in FIG. 1B, is reflected by the beam splitting element 130 and does not pass through the beam splitting element 130. At this point, the reflected light beam BR is still the first color.

As stated above, the converted light beam BT and the reflected light beam BR are transmitted to the beam splitting element 130, and the beam splitting element 130 combines the converted light beam BT and the reflected light beam BR from the wave plate 160. The beam splitting element 130 combines the converted light beam BT with the second color and the reflected light beam BR with the first color to form an illumination light beam. It is noted that the combination is to treat the converted light beam BT and the reflected light beam BR that are formed at different time points as one light beam. Because the polarization switching element 120 switches the polarized direction of the polarized light beam BP in sequence, the time points of forming the converted light beam BT and the reflected light beam BR happen alternately as time progresses. Therefore, the converted light beam BT and the reflected light beam BR of the illumination light beam leave the beam splitting element 130 alternately.

Figure 2A:
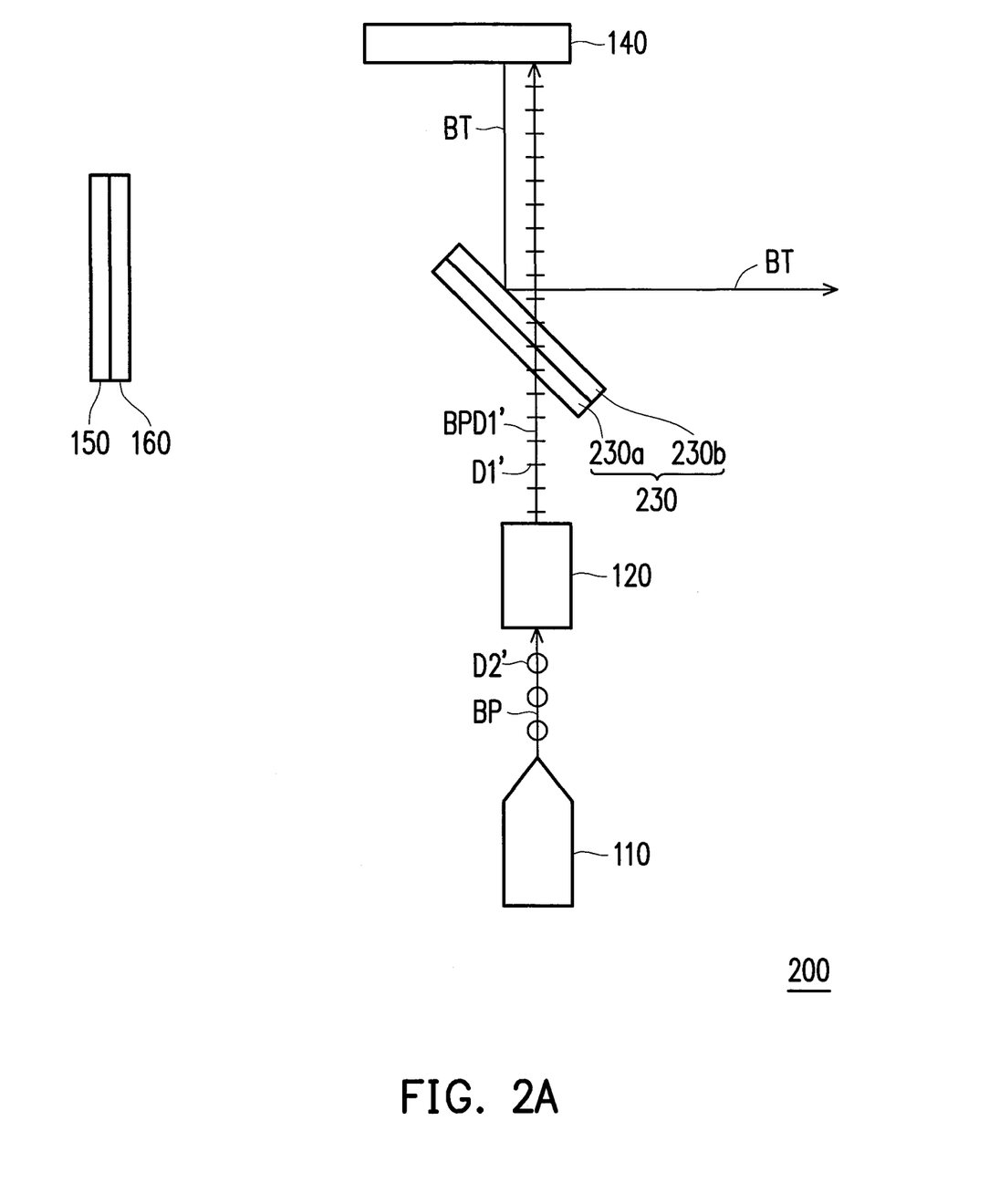
FIGS. 2A and 2B are schematic views of an illumination system according to another embodiment of the invention.
Figure 2B:
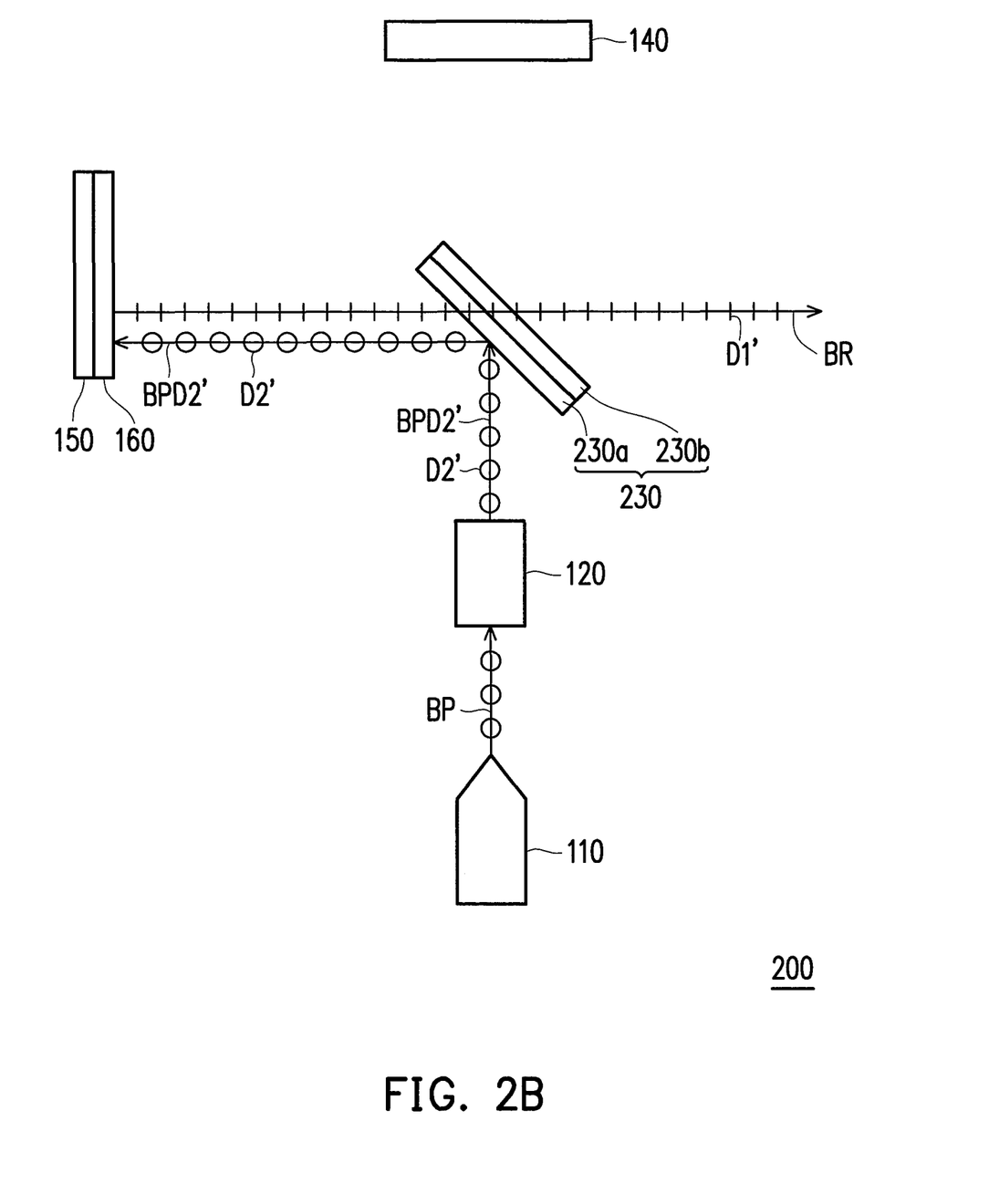

FIGS. 2A and 2B are schematic views of an illumination system 200 according to another embodiment of the invention. FIG. 2A illustrates a transmission path of a polarized light beam BPD1' having a first polarized direction Dr, and FIG. 2B illustrates a transmission path of a polarized light beam BPD2' having a second polarized direction D2'. In FIGS. 2A and 2B, the polarized direction of the polarized light beam BP is switched to the first polarized direction D1' and the second polarized direction D2' respectively at different time points. However, the first polarized direction D1' and the second polarized direction D2' in this embodiment are a P polarized direction and an S polarized direction relative to a beam splitting element 230. In addition, the beam splitting element 230 includes a polarized beam splitting unit 230a and a color separation unit 230b. The polarized beam splitting unit 230a may be a polarized beam splitting plate like the previous embodiment. The polarized beam splitting unit 230a in this embodiment allows the polarized light beam BPD1' having the first polarized direction D1' (P polarized direction) to pass through and be transmitted to the wavelength conversion element 140 and reflects the polarized light beam BPD2' having the second polarized direction D2' (S polarized direction) to the wave plate 160. The polarized light beam BPD2' is transmitted to the reflective element 150 through the wave plate 160 and becomes the reflected light beam BR after being reflected by the reflective element 150. The reflected light beam BR passes through the wave plate 160 again to form the reflected light beam BR having the first polarized direction D1' (P polarized direction), so as to pass through the polarized beam splitting unit 230a.

The color separation unit 230b allows the polarized light beam BPD1' with the first color from the polarized light source 110 to pass through and be transmitted to the wavelength conversion element 140 and reflects the converted light beam BT with the second color from the wavelength conversion element 140. In this embodiment, the color separation unit 230b is, for example, a dichroic mirror, which reflects a light with the second color and allows a light with the first color to pass through. Accordingly, the beam splitting element 230 combines the converted light beam BT and the reflected light beam BR. Regarding the configuration of the other elements and the operation of the illumination system, please refer to the embodiment of FIGS. 1A and 1B for details. The descriptions thereof are not repeated hereinafter.

Figure 3:
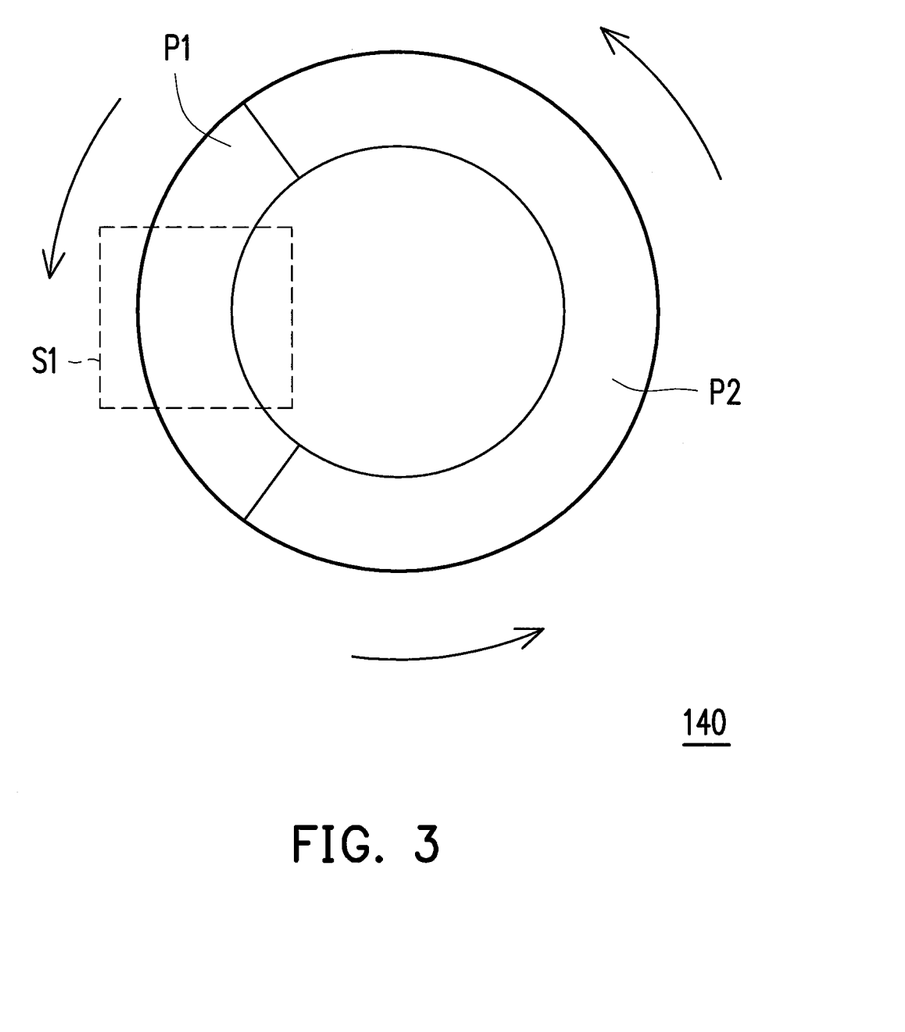
FIG. 3 is a schematic view of a wavelength conversion element according to an embodiment of the invention.

In view of the foregoing embodiment, the illumination systems 100 and 200 of the invention use the polarization switching element 120 to switch the polarized direction of the polarized light beam BP to a different polarized direction at different time points, and use the beam splitting elements 130 and 230 to split the polarized light beams having different polarized directions, and furthermore use the reflective element 150 to reflect the polarized light beams BPD2 and BPD2' having the second polarized directions D2 and D2' back to the beam splitting elements 130 and 230 for combining the light beams. Therefore, the structures of the illumination systems 100 and 200 are effectively simplified to reduce the sizes and the production costs. FIG. 3 is a schematic view of the wavelength conversion element 140 according to an embodiment of the invention. Referring to FIG. 3, the wavelength conversion element 140 includes a plurality of fluorescent reflective sections P1 and P2 having different colors. In application, when the fluorescent reflective sections P1 and P2 alternately cut in the transmission path, such as a block S1 shown in FIG. 3, of the polarized light beam BPD1 having the first polarized direction D1, the fluorescent reflective sections P1 and P2 respectively convert the polarized light beam BPD1 having the first polarized direction D1 into a plurality of sub-converted light beams having a plurality of different sub-colors. The sub-colors are mixed to form the second color, and the sub-converted light beams are mixed to form the converted light beam BT.

For example, in the case that the illumination system requires a white light beam, and the polarized light beam BPD1 with the first color is a blue polarized light beam, the wavelength conversion element 140 needs to provide the converted light beam BT with the second color, that is a yellow converted light beam BT, to be combined with the blue reflected light beam BR, which is converted from the polarized light beam BPD2, so as to form the white light beam. Accordingly, the fluorescent reflective section P1 of the wavelength conversion element 140 is applied with a fluorescent material that generates a red light beam, and the fluorescent reflective section P2 is applied with a fluorescent material that generates a green light beam. In an embodiment, considering that human eyes are more sensitive to green color, an area of the fluorescent reflective section P2 may be designed to be larger than an area of the fluorescent reflective section P1. The fluorescent reflective sections P1 and P2 alternately cut in the block S1 to be excited by the polarized light beam BPD1 and convert the polarized light beam BPD1 to a red and a green sub-converted light beams respectively. The red sub-converted light beam and the green sub-converted light beam are further mixed to form the yellow converted light beam BT to be used by the illumination system 100.

In terms of design, the illumination system 100 provided in the previous embodiment uses the polarization switching element 120 to switch the polarized direction of the polarized light beam BP to the first polarized direction D1 (S polarized direction) or the second polarized direction D2 (P polarized direction) respectively at different time points. Then, the wavelength conversion element 140 is used to convert the polarized light beam BPD1 having the first polarized direction D1, so as to form the converted light beam BT.

Figure 4:
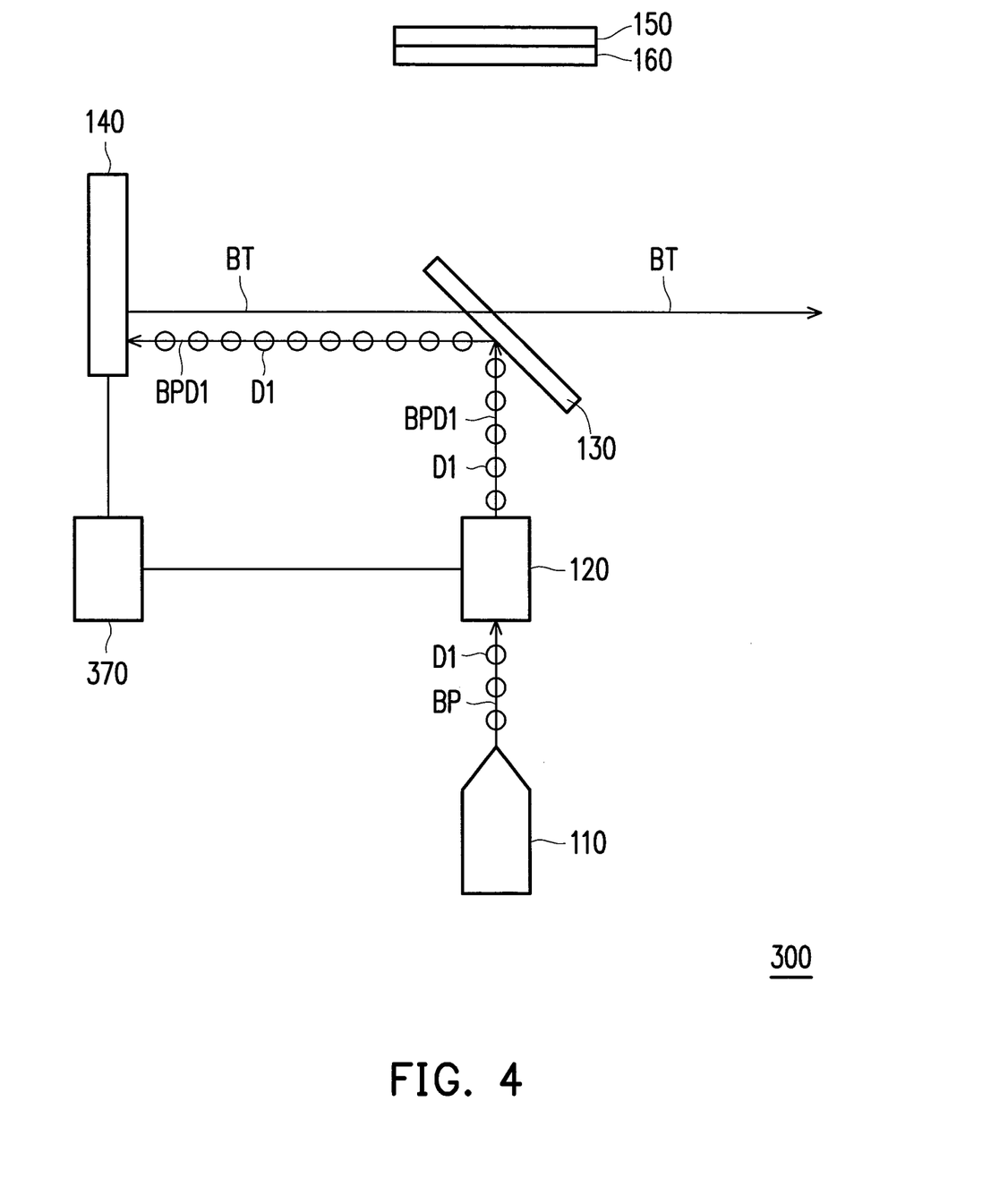
FIG. 4 is a schematic view of an illumination system according to an embodiment of the invention.

Another embodiment of the invention further provides an illumination system 300 having a control unit 370, wherein the control unit 370 is used to assist the wavelength conversion element 140 and the polarization switching element 120 to coordinate and synchronize with each other. FIG. 4 is a schematic view of the illumination system 300 according to an embodiment of the invention. Referring to FIGS. 4 and 3, the illumination system 300 includes the control unit 370, which synchronizes the polarization switching element 120 and the wavelength conversion element 140. As to the configuration of the other elements and the related operation of the illumination system, please refer to the descriptions of the previous embodiment for details. The detailed descriptions thereof are omitted hereinafter. During the time when the polarization switching element 120 switches the polarized direction of the polarized light beam BPD1 to the first polarized direction D1 (S polarized direction), the fluorescent reflective sections P1 and P2 of the wavelength conversion element 140 alternately cut in the transmission path (the block S1) of the polarized light beam BPD1 having the first polarized direction D1. The control unit 370 is electrically connected to the polarization switching element 120 and the wavelength conversion element 140 in order to assist the synchronization. In this embodiment, the control unit 370 is, for example, a microcontroller or a control circuit.

Figure 5:
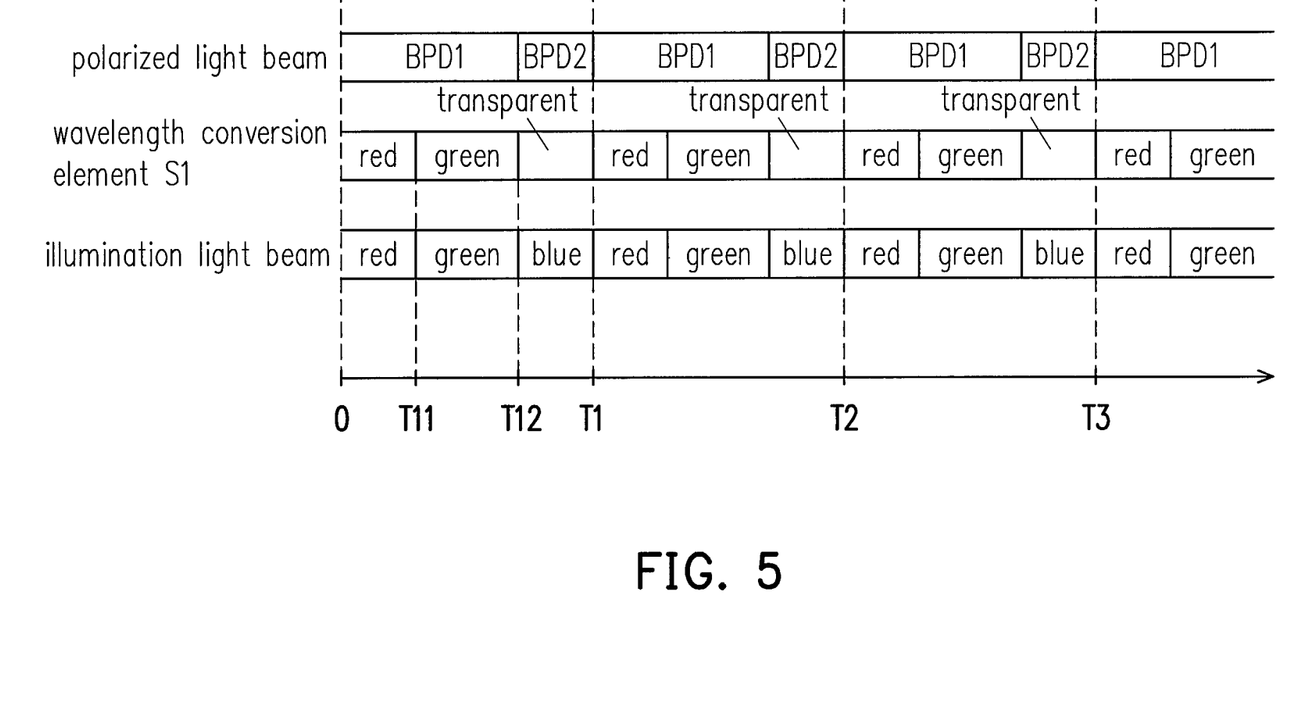
FIG. 5 is a synchronous timing diagram of a polarization switching element and the wavelength conversion element according to an embodiment of the invention.

FIG. 5 is a synchronous timing diagram of the polarization switching element 120 and the wavelength conversion element 140 according to an embodiment of the invention. Referring to FIG. 5, the polarization switching element 120 switches the polarized direction of the polarized light beam BP having the first color to the first polarized direction D1 (S polarized direction) or the second polarized direction D2 (P polarized direction) at different time points. The first color is, for example, blue. The synchronous timing diagram of FIG. 5 includes different time sections, such as a first time section 0-T1, a second time section T1-T2, and a third time section T2-T3, each of which is a period of time. Referring to the first time section 0-T1, the polarization switching element 120 switches the polarized direction of the polarized light beam BP to the first polarized direction D1 in a sub-time section 0-T12 of the first time section 0-T1. In a sub-time section T12-T1, the polarized direction of the polarized light beam BP is switched to the second polarized direction D2. Accordingly, the polarization switching element 120 alternately switches the polarized direction in different time periods. The aforementioned switching proceeding would be repeated.

The control unit 370 simultaneously controls the wavelength conversion element 140 to convert the polarized light beam BPD2 to the converted light beam with the second color. Take the formation of a white illumination light beam as an example, since the aforementioned polarized light beam BP with the first color is a blue polarized light beam, the converted light beam with the second color needs to be a yellow converted light beam. In this embodiment, the fluorescent reflective sections P1 and P2 of the wavelength conversion element 140 are applied with fluorescent materials that respectively generate a red light beam and a green light beam, and the area of the fluorescent reflective section P2 is greater than the area of the fluorescent reflective section P1. In the first time section 0-T1, the fluorescent reflective sections P1 and P2 of the wavelength conversion element 140 alternately cut in the transmission path of the polarized light beam BPD1 to convert the polarized light beam BPD1, so as to form a plurality of sub-converted light beams having different sub-colors. Take FIG. 5 as an example, the wavelength conversion element 140 converts the polarized light beam BPD1 to form a red sub-converted light beam in a sub-time section 0-T11 and converts the polarized light beam BPD1 to form a green sub-converted light beam in a sub-time section T11-T12. It is noted that, though the fluorescent reflective section P2 of the wavelength conversion element 140 cuts in the transmission path of the polarized light beam BPD1 in the sub-time section T12-T1, the polarized light beam BPD1 is not in the transmission path of the polarized light beam BPD1 because the polarized direction of the polarized light beam BP has been switched to the second polarized direction D2 by the polarization switching element 120. Therefore, the wavelength conversion element 140 does not convert the polarized light beam BPD1 to form the sub-converted light beams. Thus, in other embodiments, the fluorescent reflective section P1 may cut in the transmission path of the polarized light beam BPD1 (in fact the polarized light beam BPD1 is not on the transmission path at the moment) in the sub-time section T12-T1 instead, or the fluorescent reflective sections P1 and P2 may alternately cut in the transmission path of the polarized light beam BPD1 in the sub-time section T12-T1 instead. Otherwise, a blank area, a transparent area, or a light absorption area of the wavelength conversion element 140 may cut in the transmission path of the polarized light beam BPD1 at the moment instead, and no fluorescent reflective section cuts in the transmission path of the polarized light beam BPD1.

In the first time section 0-T1, the wavelength conversion element 140 respectively forms the red sub-converted light beam and the green sub-converted light beam in the sub-time section 0-T11 and the sub-time section T11-T12 and mixes the same to form the yellow converted light beam BT. In the sub-time section T12-T1, the polarized light beam BPD2 passes through the wave plate 160 and is reflected by the reflective element 150 to form the reflected light beam BR, which is a blue reflected light beam BR. The converted light beam BT and the reflected light beam BR are combined by the beam splitting element 130 to form the illumination light beam. As mentioned above, the combination is to treat the converted light beam BT and the reflected light beam BR that are formed at different time points as one light beam. Thus, the illumination light beam becomes red, green, and blue in sequence in the first time section 0-T1, and those colors are combined to form the white illumination light beam. According to the above, the control unit 370 maintains the synchronization of the wavelength conversion element 140 and the polarization switching element 120 in the second time section T1-T2, the third time section T2-T3, and a plurality of time sections thereafter and repeats the aforementioned operation. The foregoing example is for forming the white illumination light beam. However, the related elements may be modified or disposed differently to form illumination light beams with other colors if the illumination system is required to output illumination light beams with other colors.

The timing synchronization method shown in FIG. 5 is also applicable to the embodiments of FIG. 2A and FIG. 2B. Details thereof shall not be repeated hereinafter.

Figure 6:
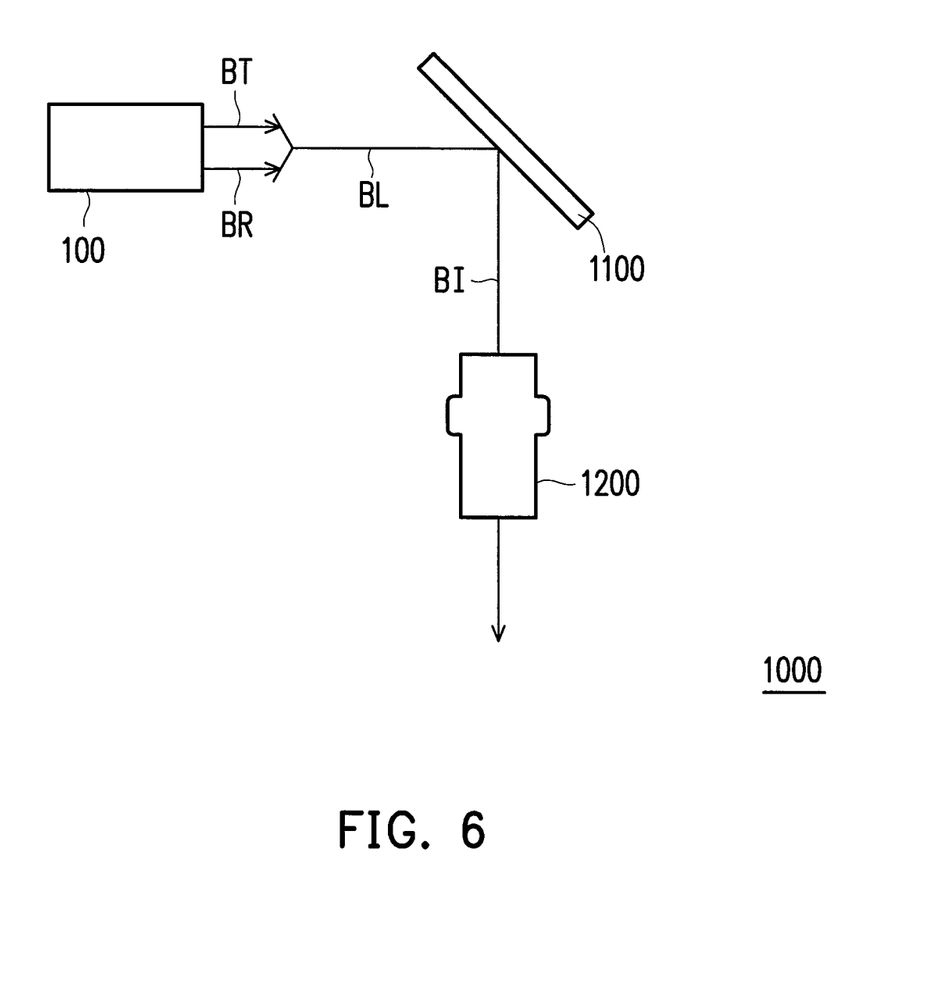
FIG. 6 is a schematic view illustrating a projection device according to an embodiment of the invention.

FIG. 6 is a schematic view illustrating a projection device 1000 according to an embodiment of the invention. The projection device 1000 includes the illumination system 100, a light valve 1100, and a projection lens 1200. The illumination system 100 combines the converted light beam BT and the reflected light beam BR to form the illumination light beam BL. The light valve 1100 is disposed on the transmission path of the illumination light beam BL and converts the illumination light beam BL to an image light beam BI. The projection lens 1200 is disposed on a transmission path of the image light beam BI to assist the projection device 1000 to project a required image. As to the configuration of the other elements, please refer to the previous embodiments and the related views. The detailed descriptions thereof are omitted hereinafter. In this embodiment, the light valve 1100, for example, is a digital micro-mirror device (DMD) or a liquid-crystal-on-silicon panel.

In addition, in order to increase a color gamut of the image projected by the projection device 1000, the wavelength conversion element 140 further includes a fluorescent reflective section for generating a light beam with a color other than red and green. For example, the wavelength conversion element 140 includes the fluorescent reflective section for generating a red light beam, the fluorescent reflective section for generating a green light beam, and the fluorescent reflective section for generating a yellow light beam. These fluorescent reflective sections alternately cut in the transmission path of the polarized light beam BPD1. Thereby, the illumination system 100 provides the white illumination light beam BL formed by mixing red light, green light, blue light, and yellow light to increase the color gamut of the image.

Figure 7:
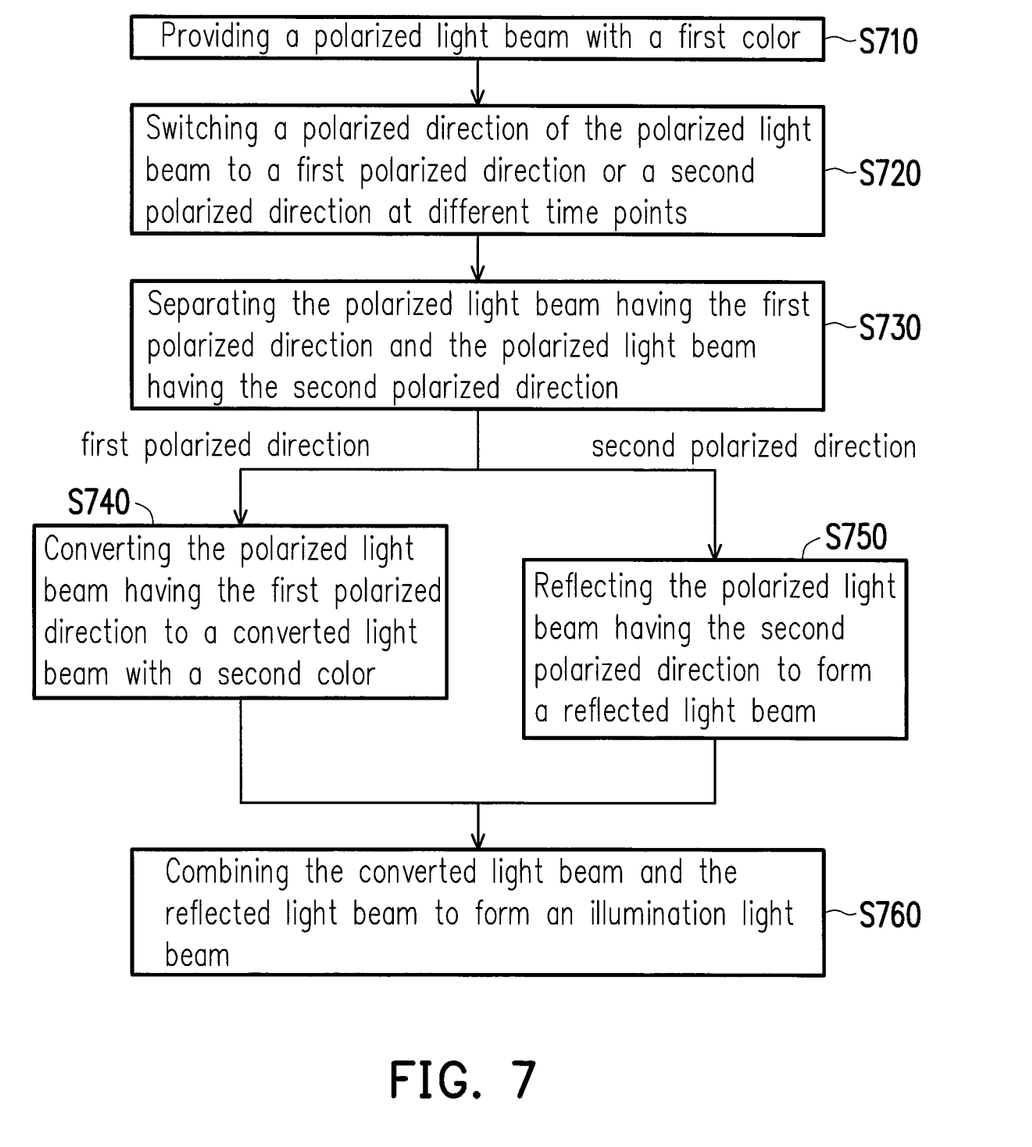
FIG. 7 is a flowchart illustrating an illumination method according to an embodiment of the invention.

FIG. 7 is a flowchart illustrating an illumination method according to an embodiment of the invention. Referring to FIG. 7, the illumination method of this embodiment is applicable to the illumination systems 100, 200, and 300 of the above-mentioned embodiments. For example, the illumination method is applied to the illumination system 100 below. The illumination method of this embodiment includes the following steps. In Step S710, a polarized light beam having a first color is provided. For example, the polarized light source 110 is used to provide the polarized light beam BP having the first color. In Step S720, the polarized direction of the polarized light beam BP is switched to the first polarized direction D1 and the second polarized direction D2 respectively at different time points. In this embodiment, for example, the polarization switching element 120 is used to switch the polarized direction of the polarized light beam BP at different time points. In Step S730, for example, the beam splitting element 130 is used to separate the polarized light beam BPD1 having the first polarized direction D1 and the polarized light beam BPD2 having the second polarized direction D2. The polarized light beam BPD1 having the first polarized direction D1 passes through the wavelength conversion element 140, for example, and is converted to the converted light beam BT having the second color in Step S740. Moreover, the polarized light beam BPD2 having the second polarized direction D2 is reflected to form the reflected light beam BR by using the reflective element 150 and the wave plate 160 in Step S750. When the polarized light beam BPD1 is converted to the converted light beam BT having the second color, and the polarized direction of the polarized light beam BPD1 is the first polarized direction D1, the polarized light beam BPD1 having the first polarized direction D1 is sequentially converted to sub-converted light beams having a plurality of sub-colors. The sub-colors are used to be mixed to form the second color, and the sub-converted light beams are mixed to form the converted light beam BT. In Step S760, the converted light beam BT and the reflected light beam BR are combined to form the illumination light beam.

According to the illumination method provided in this embodiment, the polarized direction of the polarized light beam is switched to one of the first polarized direction and the second polarized direction respectively at different time points, and the polarized light beams having different polarized directions are converted to the converted light beam having the second color or the reflected light beam having the first color. Thus, the polarized light beam is used effectively by a time-sharing method.

The operation details of how to use the illumination system to convert the polarized light beam to the converted light beam or to reflect the polarized light beam to form the reflected light beam and how to combine the converted light beam and the reflected light beam are explained in the previous embodiments. The detailed descriptions thereof are omitted hereinafter.

In conclusion of the above, the illumination system and the projection device according to the embodiments of the invention use the polarization switching element to switch the polarized direction of the polarized light beam to a different polarized direction at different time points, use the beam splitting element to separate the polarized light beams having different polarized directions, and use the reflective element to reflect the polarized light beam having the second polarized direction back to the beam splitting element for combining light. Therefore, the structures of the illumination system and the projection device are effectively reduced to decrease the sizes and the production costs thereof. Moreover, the illumination method in the embodiment of the invention switches the polarized direction of the polarized light beam to the first polarized direction and the second polarized direction respectively at different time points; thus, the polarized light beam is used effectively by means of the time-sharing method.

Although the invention has been described with reference to the above embodiments, it will be apparent to one of ordinary skill in the art that modifications and variations to the described embodiments may be made without departing from the spirit and scope of the invention. Accordingly, the scope of the invention will be defined by the attached claims not by the above detailed descriptions. Moreover, the abstract and the headings are merely used to aid in search of patent files and are not intended to limit the scope of the claims of the invention. In addition, terms such as the first polarized direction and the second polarized direction mentioned in the specification are only used to identify elements and are not intended to limit the numbers of the elements.

What is claimed is:

1. An illumination system, comprising:
   a polarized light source emitting a polarized light beam with a first color;
   a polarization switching element disposed on a transmission path of the polarized light beam and switching a polarized direction of the polarized light beam to one of a first polarized direction and a second polarized direction at different time points;
   a beam splitting element disposed on the transmission path of the polarized light beam and splitting the polarized light beam having the first polarized direction and the polarized light beam having the second polarized direction;
   a wavelength conversion element converting the polarized light beam having the first polarized direction from the beam splitting element to a converted light beam with a second color;
   a reflective element reflecting the polarized light beam having the second polarized direction from the beam splitting element to form a reflected light beam; and
   a wave plate disposed on a transmission path of the polarized light beam having the second polarized direction and a transmission path of the reflected light beam, and located between the beam splitting element and the reflective element, wherein the beam splitting element combines the converted light beam and the reflected light beam from the wave plate.

2. The illumination system according to claim 1, wherein the beam splitting element generates a polarized light splitting effect on the polarized light beam with the first color and does not generate the polarized light splitting effect on the converted light beam with the second color.

3. The illumination system according to claim 1, wherein the beam splitting element reflects the polarized light beam having the first polarized direction from the polarization switching element to the wavelength conversion element and allows the polarized light beam having the second polarized direction from the polarization switching element to pass through and be transmitted to the wave plate.

4. The illumination system according to claim 1, wherein the beam splitting element allows the polarized light beam having the first polarized direction from the polarization switching element to pass through and be transmitted to the wavelength conversion element and reflects the polarized light beam having the second polarized direction from the polarization switching element to the wave plate, and the beam splitting element reflects the converted light beam from the wavelength conversion element and allows the reflected light beam from the wave plate to pass through.

5. The illumination system according to claim 4, wherein the beam splitting element comprises:
   a polarized beam splitting unit allowing the polarized light beam having the first polarized direction from the polarization switching element to pass through and be transmitted to the wavelength conversion element, reflecting the polarized light beam having the second polarized direction from the polarization switching element to the wave plate, and allowing the reflected light beam from the wave plate to pass through; and
   a color separation unit allowing the polarized light beam with the first color from the polarized light source to pass through and be transmitted to the wavelength conversion element and reflecting the converted light beam with the second color from the wavelength conversion element.

6. The illumination system according to claim 1, wherein the polarization switching element is a switchable wave plate.

7. The illumination system according to claim 1, wherein the wave plate is a quarter wave plate.

8. The illumination system according to claim 1, wherein the wavelength conversion element comprises a plurality of fluorescent reflective sections generating different colors, wherein the fluorescent reflective sections alternately cut in a transmission path of the polarized light beam having the first polarized direction to convert the polarized light beam having the first polarized direction to a plurality of sub-converted light beams having a plurality of different sub-colors, and the sub-colors are mixed to form the second color and the sub-converted light beams are mixed to form the converted light beam.

9. The illumination system according to claim 8, further comprising a control unit controlling the polarization switching element and the wavelength conversion element to synchronize with each other, wherein the fluorescent reflective sections alternately cut in the transmission path of the polarized light beam having the first polarized direction during a time when the polarization switching element maintains the polarized direction of the polarized light beam in the first polarized direction.

10. A projection device, comprising:
    an illumination system comprising a polarized light source, a polarization switching element, a beam splitting element, a wavelength conversion element, a reflective element, and a wave plate, wherein
    the polarized light source emits a polarized light beam with a first color;
    the polarization switching element is disposed on a transmission path of the polarized light beam and switches a polarized direction of the polarized light beam to one of a first polarized direction and a second polarized direction at different time points;
    the beam splitting element is disposed on the transmission path of the polarized light beam and splits the polarized light beam having the first polarized direction and the polarized light beam having the second polarized direction;
    the wavelength conversion element converts the polarized light beam having the first polarized direction from the beam splitting element to a converted light beam with a second color;
    the reflective element reflects the polarized light beam having the second polarized direction from the beam splitting element to form a reflected light beam; and
    the wave plate is disposed on a transmission path of the polarized light beam having the second polarized direction and a transmission path of the reflected light beam, and located between the beam splitting element and the reflective element, wherein the beam splitting element combines the converted light beam and the reflected light beam from the wave plate to form an illumination light beam;
    a light valve converting the illumination light beam to an image light beam; and
    a projection lens disposed on a transmission path of the image light beam.

11. The projection device according to claim 10, wherein the beam splitting element generates a polarized light splitting effect on the polarized light beam with the first color and does not generate the polarized light splitting effect on the converted light beam with the second color.

12. The projection device according to claim 10, wherein the beam splitting element reflects the polarized light beam having the first polarized direction from the polarization switching element to the wavelength conversion element and allows the polarized light beam having the second polarized direction from the polarization switching element to pass through and be transmitted to the wave plate.

13. The projection device according to claim 10, wherein the beam splitting element allows the polarized light beam having the first polarized direction from the polarization switching element to pass through and be transmitted to the wavelength conversion element and reflects the polarized light beam having the second polarized direction from the polarization switching element to the wave plate, and the beam splitting element reflects the converted light beam from the wavelength conversion element and allows the reflected light beam from the wave plate to pass through.

14. The projection device according to claim 13, wherein the beam splitting element comprises:
   a polarized beam splitting unit allowing the polarized light beam having the first polarized direction from the polarization switching element to pass through and be transmitted to the wavelength conversion element, reflecting the polarized light beam having the second polarized direction from the polarization switching element to the wave plate, and allowing the reflected light beam from the wave plate to pass through; and
   a color separation unit allowing the polarized light beam with the first color from the polarized light source to pass through and be transmitted to the wavelength conversion element and reflecting the converted light beam with the second color from the wavelength conversion element.

15. The projection device according to claim 10, wherein the polarization switching element is a switchable wave plate.

16. The projection device according to claim 10, wherein the wave plate is a quarter wave plate.

17. The projection device according to claim 10, wherein the wavelength conversion element comprises a plurality of fluorescent reflective sections generating different colors, wherein the fluorescent reflective sections alternately cut in a transmission path of the polarized light beam having the first polarized direction to convert the polarized light beam having the first polarized direction to a plurality of sub-converted light beams having a plurality of different sub-colors, and the sub-colors are mixed to form the second color and the sub-converted light beams are mixed to form the converted light beam.

18. The projection device according to claim 17, wherein the illumination system further comprises a control unit controlling the polarization switching element and the wavelength conversion element to synchronize with each other, wherein the fluorescent reflective sections alternately cut in the transmission path of the polarized light beam having the first polarized direction during a time when the polarization switching element maintains the polarized direction of the polarized light beam in the first polarized direction.

19. An illumination method, adapted for an illumination system, the illumination method comprising:
   providing a polarized light beam with a first color;
   switching a polarized direction of the polarized light beam to one of a first polarized direction and a second polarized direction at different time points;
   separating the polarized light beam having the first polarized direction and the polarized light beam having the second polarized direction;
   converting the polarized light beam having the first polarized direction to a converted light beam with a second color;
   reflecting the polarized light beam having the second polarized direction to form a reflected light beam; and
   combining the converted light beam and the reflected light beam to form an illumination light beam.

20. The illumination method according to claim 19, wherein the step of converting the polarized light beam having the first polarized direction to the converted light beam with the second color comprises:
   sequentially converting the polarized light beam having the first polarized direction to a plurality of sub-converted light beams having a plurality of different sub-colors when the polarized direction of the polarized light beam is the first polarized direction, wherein the sub-colors are mixed to form the second color and the sub-converted light beams are mixed to form the converted light beam.

* * * * *